May 5, 1970    R. F. CONNELLY    3,510,194
PARTICLE COUNT MEMBRANE FILTER MOUNT
Filed Aug. 9, 1965

INVENTOR:
ROBERT F. CONNELLY

United States Patent Office 3,510,194
Patented May 5, 1970

3,510,194
PARTICLE COUNT MEMBRANE FILTER MOUNT
Robert F. Connelly, 131 Delmar Place,
San Gabriel, Calif. 91776
Filed Aug. 9, 1965, Ser. No. 478,356
Int. Cl. G02b 21/34
U.S. Cl. 350—95
4 Claims

ABSTRACT OF THE DISCLOSURE

A receptacle for microporous filter membranes used to determine particulate matter in fluids, the receptacle or case having a flat floor to support the filter membrane and a transparent cover spaced from the filter specimen sufficient to prevent particles on the cover from coming into focus when the specimen is examined through the cover with a microscope, thus permitting the specimen to be reexamined, if desired, without exposure to contamination from the atmosphere.

This invention relates to the field of particulate contamination in fluids, such as gases, liquid and ambient air. More specifically it relates to the analysis of particulate contamination in hydraulic oils employed in aerospace, electronic, and allied industries where the presence of particulate contamination has been found highly objectable. The invention relates still more particularly to the method of analysis wherein the particles are collected on a filter through which a measured amount of the fluid in question is passed. Then the filter is inspected under a microscope which enlarges the particles sufficiently to be counted. Filters for this purpose are usually constructed of a film of porous collodion or other plastic in which the pore size can be accurately controlled. Yet more particularly, the invention relates to a receptacle for storing and analyzing filters on which particles have been collected.

Figure 1:
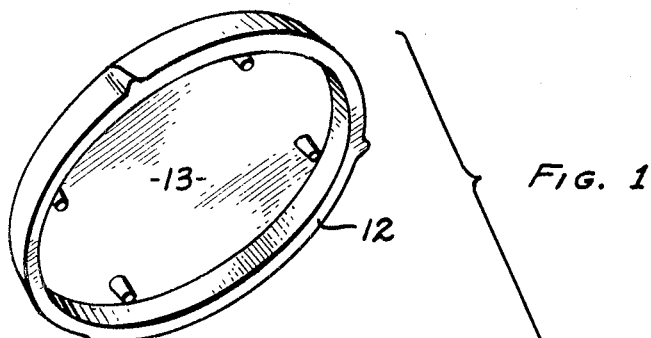
Figure 2:
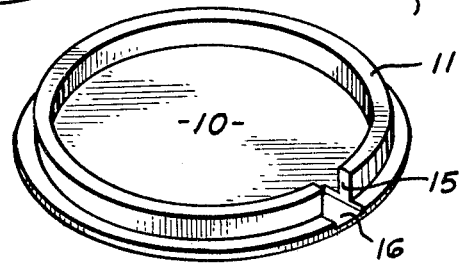
Figure 5:
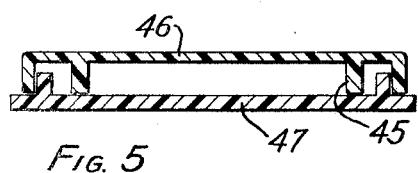
Figure 3:
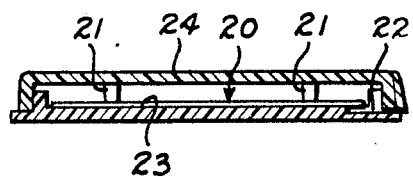
Figure 4:
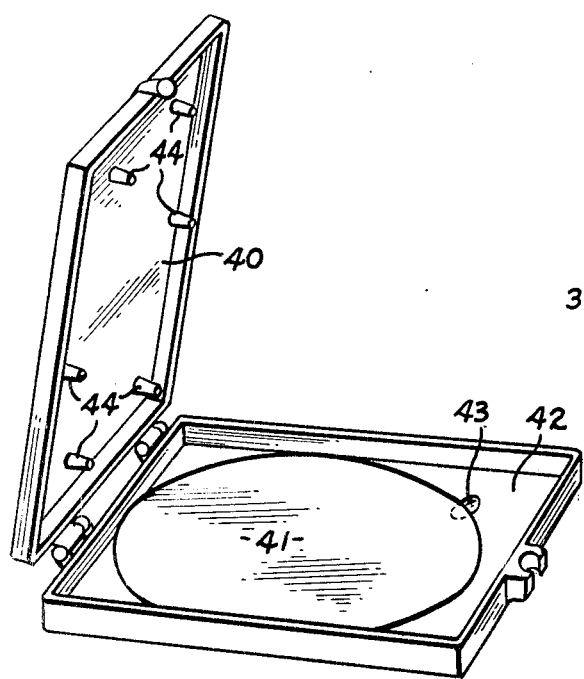

The invention is illustrated by a drawing which shows in FIG. 1 a perspective view of a circular particle count membrane filter mount. FIG. 2 is a cross section view of the filter mount shown in FIG. 1. FIG. 3 is a plan view of the same, and FIG. 4 is a perspective view of a rectangular form of particle count membrane filter mount. FIG. 5 is a cross section of the filter mount similar to FIG. 2 except that the hold-down means is a circular collar.

An object of this invention is to improve the precision and reliability of particle count analysis on membrane filters. A further object is to eliminate the necessity for performing particle counts within clean rooms and clean work stations in order to avoid atmospheric fallout. Another object is to increase the accuracy of particle counting while avoiding some manipulations heretofore necessary.

In the past it has been customary to store membrane filters in receptacles known as pocket incubators. Such a device is shown in U.S. Pat. 2,677,647. However, these devices are so tall that it is impossible to focus the microscope on the surface of the membrane filter at $100\times$ with the lid in place, and it is necessary to remove the lid, exposing the filter to contamination falling on the surface of the membrane during the analysis, yielding deceptively high particle counts. One alternate practice used by some laboratories is to mount the membrane filter between two glass slides. However, since it is generally not possible to remove all of the particles from the surface of the slide, the residual contamination on the lower surface of the cover slide adds to the contamination on the membrane filter, thus giving inaccurate results. The problem of removing particles adhering to surfaces is discussed in a publication of the Millipore Filter Corporation, 120 Ashby Road, Bedford, Mass., "Detection and Analysis of Contamination," page 4, paragraph 6.

I have now found that if a cover or lid is placed so that its lower surface is at least 0.020 inch from the surface of the membrane, any residual contamination will not be in microscope focus at the degree of magnification needed for inspection, usually above $40\times$. Naturally, any incidental contamination on the upper surface is entirely out of focus under these conditions.

There is, however, a limit to how far the upper surface of the filter mount or receptacle may be removed from the surface of the membrane. The focal plane of $10\times$ objectives of microscopes with a 160 mm. tube length is about 0.35 inch from the face of the objective lens, this corresponds to a magnification of $90\pm10\times$ which is the highest magnification required in the industry. This was recommended in "Procedure for the Determination of Particulate Contamination of Hydraulic Fluids by the Particle Count Method," published by the Society of Automotive Engineers, Inc., 485 Lexington Ave., New York, N.Y., SAE–ARP 598. This magnification is normally obtained with a $10\times$ objective and a $10\times$ ocular. Therefore, if the upper surface of the membrane filter mount is maintained less than 0.35 inch from the surface of the membrane, under inspection, I have found it possible to focus on the surface of the membrane with the cover in place. Simultaneously, the under surface of the cover should be at least 0.02 inch above the filter surface to be out of focus.

According to my invention, I have provided a membrane filter mount such that the lower surface of the lid or cover is at least 0.020 inch from the membrane and the upper surface is no more than 0.350 inch above it. Normally the upper wall of the receptacle or "cover" is made of clear plastic 0.060 to 0.080 inch thick. When constructed according to these dimensions, the receptacle satisfies the optical requirements above set forth. However, in ordinary service, one unexpected complication developed. During sampling, a differential static charge often develops across the filter. When such a charged filter is placed in the lower half of the membrane filter mount, no difficulty occurs. However, when the cover is placed on top, the membrane often snaps up and sticks to the under surface thereof. This problem was not previously encountered with the pocket incubator because these attractive and repulsive forces are rarely strong enough to operate over the greater distances involved. Accordingly, this phenomenon prevented the satisfactory performance of the membrane filter mount as modified hereinabove. To solve this problem, I have devised a filter mount in which the test membrane is positively held in position against the floor of the mount by hold-down means. To accomplish this, I have placed in the lid of the receptacle preferably made integrally therewith at least four dependant pins, located outside the inspection area, of such a length that the membrane is always held on the bottom of the receptacle. Alternatively, this can be accomplished with a continuous ring or collar or similar hold-down structure. However, particle count analysis is accomplished with oblique, incident light, as recommended by Society of Automotive Engineers "Procedure for the Determination of Particulate Contamination of Air in Dust-Controlled Spaces by the Particle Count Method," Bulletin 743, and also by American Society for Testing Materials, "Sizing and Counting Air-Borne Particulate Contamination in Clean Rooms and other Dust-Controlled Areas Designed for Electronic and Similar Applications," Method F25–63T. Incident lighting is also recommended in Federal Standard 209, "Clean Room and Work Station Requirements, Controlled Environment," dated Dec. 16, 1963, and in Federal Standard Test Method 791, "Lubricants, Liquid Fuels, and Related Products; Methods of Testing," Method 3009.1, "Determination of Solid Particle Contamination in Hydraulic Fluids." I have found that, if a collar is used to hold the membrane in position, when the angle of illumination is 15° or less, the collar tends to limit the amount of light reaching the membrane surface and in addition induces a confusing "lens" effect on areas near the fixture. I therefore prefer to employ a ring of pins spaced apart uniformly, preferably with about six to eight pins in a circle. Pins of about 0.1 inch diameter are quite satisfactory. The pins or holding ring have the further desirable effect of preventing curling where in some cases, notably in liquid analysis, membrane filters tend to curl. This curling forces the microscopist to continually refocus as he scans the surface of the filter. When employing my invention, curling is minimized or prevented entirely. The hold-down means should extend to contact the floor of the receptacle or approach closely thereto, for example within 0.005 to 0.01 inch thereof.

The membrane filters used in particle count analysis are circular, normally 47 mm. in diameter. It is therefore convenient to use a circular mount or receptacle. However, I have found that the jaws of the mechanical stage of many microscopes will not hold the circular mount securely. I have therefore constructed an alternate form of receptacle which is rectangular. It offers additional advantages in particle count analysis is that such a mount is held more securely in the jaws of common mechanical stages intended for use with a 2 inch by 3 inch microscope slide.

One other feature of my particle count membrane filter mount solves the problem of introducing and removing the membrane filter from the receptacle. For this purpose I have provided a notch in the edge of the base of the circular mount and a depression in the floor of the mount to permit entry of forceps. However, the tooling required to manufacture such a mount is an added complication. For my rectangular mount I provide only a small depression in the floor of the mount in the unoccupied area in a corner section. This can be accomplished with a simple protrusion on the surface of the mold employed in forming the plastic mounts, or by cutting or melting a depression therein.

Referring now to the drawing, FIG. 1 shows a perspective view of a circular particle count membrane filter mount. The filter membrane to be inspected is normally placed on the base or floor, 10 surrounded by the inner wall, 11 and the outer wall, 12 in the cover section, 13, thru which, when assembled, the membrane is viewed microscopically. Pins depending from the cover touch the membrane and hold it in position, preventing curling. Notch, 15 and depression 16 shown in the corner of the lower plate, facilitate entry of forceps for placing and removing the membrane.

FIG. 2 is a cross section of the circular membrane filter mount assembled for microscope inspection. The membrane 20 rests on the base or floor 23 with pins 21 holding it flat and preventing it from curling or flipping up against the top or window 24 by the action of a static electric charge. Again, the notch and depression 22 permit forceps to enter the receptacle and grasp the membrane without flexing or bending. Microscopic examination is made thru the top or cover 24.

FIG. 3 is a plan view of the circular particle count membrane filter mount of FIG. 2. Pins 30 are located in the outer periphery of the membrane 32, outside the effective filtering area to be examined, normally a circle 35 mm. diameter centrally located on the filter. The notch and depression 31 facilitate entry of forceps to pick up the membrane.

FIG. 4 is a perspective view of a rectangular particle count filter mount to support a circular filter membrane 41 shown in position on the floor or base 42. Lid 40 is the window thru which examination is performed. Six pins 44 molded into the lid 40, descend into contact with the filter membrane when the lid is closed, holding it firmly in position for examination and preventing it from curling. Depression 43 in the flat floor provides for entry of forceps to place and remove the filter when desired.

FIG. 5 is a cross section similar to FIG. 2 except that the pins 21 are omitted and in their place is a ring or collar 45 depending from the cover, 46, serving the same purpose of holding the filter membrane securely on the recepetacle floor, 47, when the receptacle cover is closed as shown.

Having thus described my invention, what I claim is:

1. A shallow receptacle for filters employed in the microscopic examination of particulate matter, said receptacle having a flat floor, a surrounding wall and a tightly fitting, dust excluding transparent cover parallel to said floor and spaced thereabove, the distance from said floor to the inner surface of said cover being at least 0.02 inch to prevent particles of dirt adhering to said inner surface from coming into focus of a microscope when focussed on a filter membrane lying on the said floor, and the distance from said floor to the outer surface of said cover being less than 0.35 inch to permit focussing microscope on said membrane thru said cover without exposing said filter membrane to contamination from the atmosphere.

2. The receptacle of claim 1 wherein said hold-down means is a plurality of pins spaced apart in a circle.

3. The receptacle of claim 1 wherein the said hold-down means is a collar depending from said cover positioned about the periphery of the said filter membrane.

4. The receptacle of claim 1 wherein a depression is provided in the floor thereof positioned at the periphery of the said filter membrane extending under the edge thereof to permit the entry of forceps for removing said filter membrane.

References Cited

UNITED STATES PATENTS

| 1,836,915 | 12/1931 | George | 350—95 |
| 2,015,949 | 10/1935 | Maw. | |
| 2,549,681 | 4/1951 | Goldstaub. | |
| 2,965,219 | 12/1960 | Rhodin | 206—45.34 X |
| 3,242,604 | 3/1966 | Ott | 40—152 |
| 3,350,979 | 11/1967 | Detweiler | 350—94 XR |

PAUL R. GILLIAM, Primary Examiner

U.S. Cl. X.R.

350—61, 94; 356—244

UNITED STATES PATENT OFFICE
CERTIFICATE OF CORRECTION

Patent No. 3,510,194          Dated May 5, 1970

Inventor(s) Robert F. Connelly

It is certified that error appears in the above-identified patent and that said Letters Patent are hereby corrected as shown below:

Column 4, line 26, after "surrounding" insert --vertical--;

Column 4, lines 27 and 28, cancel "parallel to said floor";

Column 4, line 28, cancel "thereabove" and insert --above said floor--;

Column 4, line 35, before "microscope" insert --a--;

Column 4, line 37, change the period to a comma and insert --and a hold-down means integral with the said cover and depending therefrom, extending substantially to the floor of the receptacle for holding the filter membrane against said floor, said hold-down means being positioned outside the periphery of the area to be inspected.--

Signed and sealed this 13th day of July 1971.

(SEAL)
Attest:

EDWARD M. FLETCHER, JR.            WILLIAM E. SCHUYLER, JR.
Attesting Officer                  Commissioner of Patents